United States Patent
Frandzel et al.

(10) Patent No.: US 10,489,584 B2
(45) Date of Patent: Nov. 26, 2019

(54) LOCAL AND GLOBAL EVALUATION OF MULTI-DATABASE SYSTEM

(71) Applicant: Microsoft Technology Licensing, LLC, Redmond, WA (US)

(72) Inventors: Yoav M. Frandzel, Cabri (IL); Ram Bracha, Seattle, WA (US); Oren Yossef, Redmond, WA (US); Tomer Weisberg, Haifa (IL); Yoav Y. Rubin, Vancouver (CA); Ron Matchoro, Hogla (IL); Andrey Karpovsky, Kiryat Motzkin (IL)

(73) Assignee: Microsoft Technology Licensing, LLC, Redmond, WA (US)

( * ) Notice: Subject to any disclaimer, the term of this patent is extended or adjusted under 35 U.S.C. 154(b) by 187 days.

(21) Appl. No.: 15/432,640

(22) Filed: Feb. 14, 2017

(65) Prior Publication Data

US 2018/0232520 A1 Aug. 16, 2018

(51) Int. Cl.
*G06F 16/21* (2019.01)
*G06F 21/55* (2013.01)
*G06F 21/56* (2013.01)

(52) U.S. Cl.
CPC ............ *G06F 21/552* (2013.01); *G06F 16/21* (2019.01); *G06F 21/566* (2013.01)

(58) Field of Classification Search
CPC .................. G06F 21/552; G06F 21/556; G06F 17/30289; G06F 2221/033
See application file for complete search history.

(56) References Cited

U.S. PATENT DOCUMENTS

| 7,120,933 | B2 | 10/2006 | Mattsson |
| 7,448,084 | B1* | 11/2008 | Apap ................... G06F 21/552 726/24 |
| 7,725,937 | B1 | 5/2010 | Levy |

(Continued)

FOREIGN PATENT DOCUMENTS

WO 2005093546 A1 10/2005

OTHER PUBLICATIONS

Thakur, et al., "A Multi-Dimensional approach towards Intrusion Detection System", In arXiv preprint arXiv, May 10, 2012, 8 pages.

(Continued)

*Primary Examiner* — Khoi V Le
(74) *Attorney, Agent, or Firm* — Workman Nydegger

(57) ABSTRACT

Identifying suspicious activity at a database of a multi-database system. A global evaluation of a plurality of interactions associated with a plurality of databases included within the multi-database system may be performed. A local evaluation of a plurality of interactions associated with a particular database of the plurality of databases may also be performed. The plurality of interactions associated with the particular database may comprise a subset of the plurality of interactions associated with the plurality of databases. A combination of both the global evaluation and the local evaluation may be analyzed to thereby identify one or more suspicious activities occurring at the particular database. Based on the analysis of the combination of the global evaluation and the local evaluation, one or more suspicious activities occurring at the particular database may then be identified.

17 Claims, 3 Drawing Sheets

(56) References Cited

U.S. PATENT DOCUMENTS

| | | | |
|---|---|---|---|
| 8,789,179 B2 | 7/2014 | Sabin | |
| 9,032,531 B1 | 5/2015 | Scorvo et al. | |
| 9,088,606 B2 | 7/2015 | Ranum et al. | |
| 9,462,013 B1 | 10/2016 | Boss et al. | |
| 2002/0133721 A1* | 9/2002 | Adjaoute | G06Q 20/04 726/23 |
| 2007/0083928 A1* | 4/2007 | Mattsson | G06F 21/552 726/22 |
| 2011/0191303 A1* | 8/2011 | Kaufman | G06F 7/00 707/684 |
| 2015/0073981 A1* | 3/2015 | Adjaoute | G06Q 20/4016 705/39 |
| 2015/0355957 A1* | 12/2015 | Steiner | G06F 11/0772 714/37 |
| 2016/0036833 A1* | 2/2016 | Ardeli | H04L 63/101 726/22 |
| 2016/0191559 A1 | 6/2016 | Mhatre et al. | |
| 2017/0206353 A1* | 7/2017 | Jai | G06F 21/565 |
| 2018/0157838 A1* | 6/2018 | Bushey | G06F 21/57 |

OTHER PUBLICATIONS

Shelke, et al., "Intrusion Detection System for Cloud Computing", In International Journal of Scientific & Technology Research vol. 1, Issue 4, May 2012, pp. 67-71.

\* cited by examiner

LOCAL AND GLOBAL EVALUATION OF MULTI-DATABASE SYSTEM

BACKGROUND

Computer systems and related technology affect many aspects of society. Indeed, the computer system's ability to process information has transformed the way we live and work. Computer systems now commonly perform a host of tasks (e.g., word processing, scheduling, accounting, etc.) that prior to the advent of the computer system were performed manually. More recently, computer systems have been coupled to one another and to other electronic devices to form both wired and wireless computer networks over which the computer systems and other electronic devices can transfer electronic data.

Using such networks, enormous amounts of data are transferred and shared each minute of each day. Portions of such data are often stored in some type of organized manner. For instance, databases are one way in which large volumes of data can be organized and efficiently accessed. Oftentimes, databases store sensitive of data regarding large numbers of individuals, including social security numbers, credit card numbers, passwords, and so forth. As such, the ability to ensure that such sensitive data is protected is increasingly important.

The subject matter claimed herein is not limited to embodiments that solve any disadvantages or that operate only in environments such as those described above. Rather, this background is only provided to illustrate one exemplary technology area where some embodiments described herein may be practiced.

BRIEF SUMMARY

At least some embodiments described herein relate to identifying suspicious activity at a database of a multi-database system. For example, embodiments may include performing a global evaluation of a plurality of interactions associated with a plurality of databases included within the multi-database system. Embodiments may further include performing a local evaluation of a plurality of interactions associated with a particular database of the plurality of databases. The plurality of interactions associated with the particular database may comprise a subset of the plurality of interactions associated with the plurality of databases. Embodiments may also include evaluating a combination of both the global evaluation and the local evaluation to thereby identify one or more suspicious activities occurring at the particular database. Based on the analysis of the combination of the global evaluation and the local evaluation, one or more suspicious activities occurring at the particular database may then be identified.

Accordingly, local evaluations of databases within a multi-database system may be performed in conjunction with global evaluations of the entire multi-database system such that insights at both levels may be used to identify suspicious or malicious activity that may be occurring at one or more of the databases of the multi-database system. Such insights may allow for identifying sensitive data included within each database, as well as distinguishing between normal activity and suspicious activity even among those database users that have valid credentials. Additionally, such global evaluations may be used locally by particular databases to heighten awareness and suspicion of current interactions when one or more data breaches are occurring or have recently occurred with respect to one or more other databases of the multi-database system.

This summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

In order to describe the manner in which the above-recited and other advantages and features of the invention can be obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which.

DETAILED DESCRIPTION

At least some embodiments described herein relate to identifying suspicious activity at a database of a multi-database system. For example, embodiments may include performing a global evaluation of a plurality of interactions associated with a plurality of databases included within the multi-database system. Embodiments may further include performing a local evaluation of a plurality of interactions associated with a particular database of the plurality of databases. The plurality of interactions associated with the particular database may comprise a subset of the plurality of interactions associated with the plurality of databases. Embodiments may also include evaluating a combination of both the global evaluation and the local evaluation to thereby identify one or more suspicious activities occurring at the particular database. Based on the analysis of the combination of the global evaluation and the local evaluation, one or more suspicious activities occurring at the particular database may then be identified.

Accordingly, local evaluations of databases within a multi-database system may be performed in conjunction with global evaluations of the entire multi-database system such that insights at both levels may be used to identify suspicious or malicious activity that may be occurring at one or more of the databases of the multi-database system. Such insights may allow for identifying sensitive data included within each database, as well as distinguishing between normal activity and suspicious activity even among those database users that have valid credentials. Additionally, such global evaluations may be used locally by particular databases to heighten awareness and suspicion of current interactions when one or more data breaches are occurring or have recently occurred with respect to one or more other databases of the multi-database system.

Some introductory discussion of a computing system will be described with respect to FIG. 1. Then identifying suspicious activity at a database of a multi-database system will be described with respect to FIGS. 2 through 4.

Computing systems are now increasingly taking a wide variety of forms. Computing systems may, for example, be handheld devices, appliances, laptop computers, desktop computers, mainframes, distributed computing systems, datacenters, or even devices that have not conventionally been considered a computing system, such as wearables (e.g., glasses). In this description and in the claims, the term "computing system" is defined broadly as including any device or system (or combination thereof) that includes at least one physical and tangible processor, and a physical and tangible memory capable of having thereon computer-executable instructions that may be executed by a processor. The memory may take any form and may depend on the nature and form of the computing system. A computing system may be distributed over a network environment and may include multiple constituent computing systems.

Figure 1:
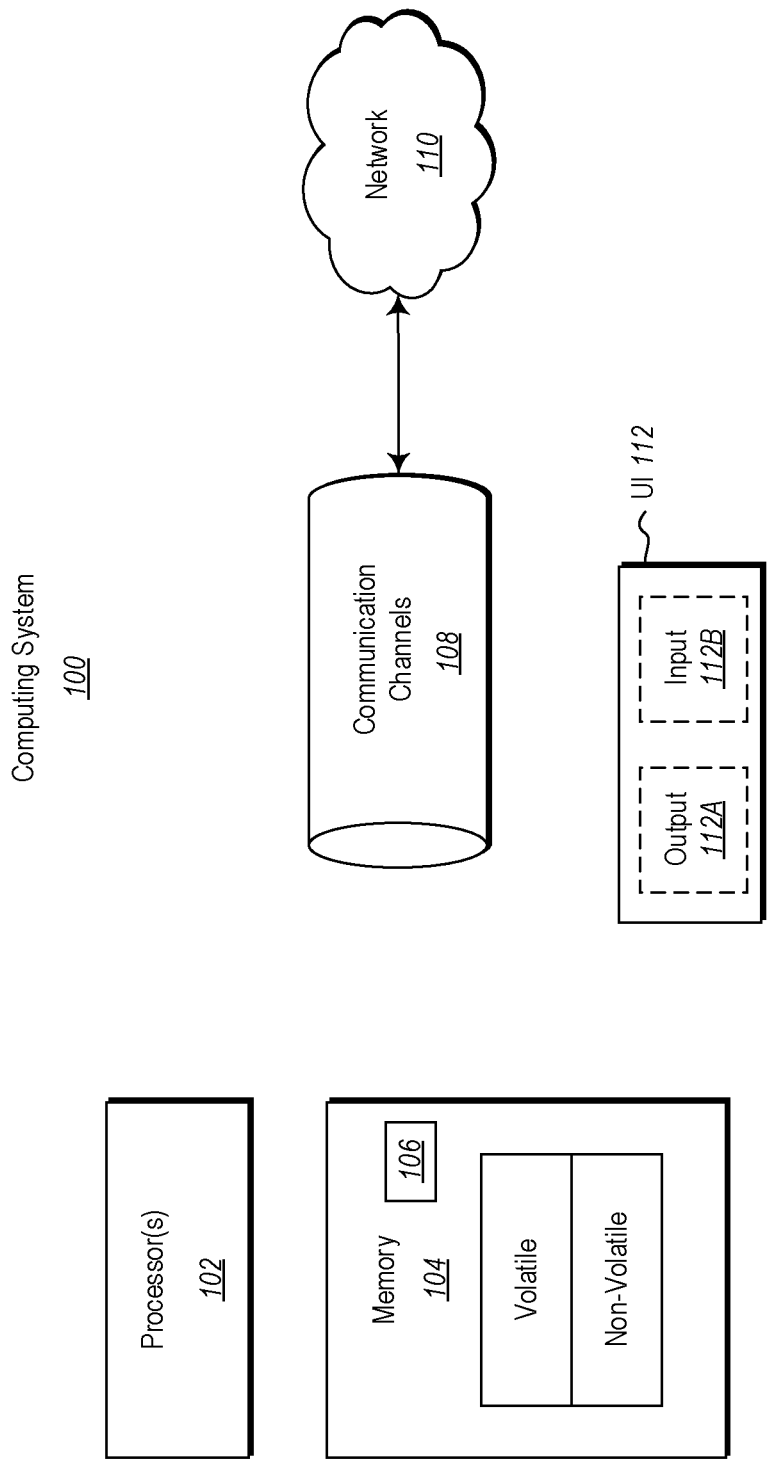
FIG. 1 illustrates an example computer architecture that facilitates operation of the principles described herein.

As illustrated in FIG. 1, in its most basic configuration, a computing system 100 typically includes at least one hardware processing unit 102 and memory 104. The memory 104 may be physical system memory, which may be volatile, non-volatile, or some combination of the two. The term "memory" may also be used herein to refer to non-volatile mass storage such as physical storage media. If the computing system is distributed, the processing, memory and/or storage capability may be distributed as well.

The computing system 100 also has thereon multiple structures often referred to as an "executable component". For instance, the memory 104 of the computing system 100 is illustrated as including executable component 106. The term "executable component" is the name for a structure that is well understood to one of ordinary skill in the art in the field of computing as being a structure that can be software, hardware, or a combination thereof. For instance, when implemented in software, one of ordinary skill in the art would understand that the structure of an executable component may include software objects, routines, methods, and so forth, that may be executed on the computing system, whether such an executable component exists in the heap of a computing system, or whether the executable component exists on computer-readable storage media.

In such a case, one of ordinary skill in the art will recognize that the structure of the executable component exists on a computer-readable medium such that, when interpreted by one or more processors of a computing system (e.g., by a processor thread), the computing system is caused to perform a function. Such structure may be computer-readable directly by the processors (as is the case if the executable component were binary). Alternatively, the structure may be structured to be interpretable and/or compiled (whether in a single stage or in multiple stages) so as to generate such binary that is directly interpretable by the processors. Such an understanding of example structures of an executable component is well within the understanding of one of ordinary skill in the art of computing when using the term "executable component".

The term "executable component" is also well understood by one of ordinary skill as including structures that are implemented exclusively or near-exclusively in hardware, such as within a field programmable gate array (FPGA), an application specific integrated circuit (ASIC), or any other specialized circuit. Accordingly, the term "executable component" is a term for a structure that is well understood by those of ordinary skill in the art of computing, whether implemented in software, hardware, or a combination. In this description, the terms "component", "service", "engine", "module", "control", or the like may also be used. As used in this description and in the case, these terms (whether expressed with or without a modifying clause) are also intended to be synonymous with the term "executable component", and thus also have a structure that is well understood by those of ordinary skill in the art of computing.

In the description that follows, embodiments are described with reference to acts that are performed by one or more computing systems. If such acts are implemented in software, one or more processors (of the associated computing system that performs the act) direct the operation of the computing system in response to having executed computer-executable instructions that constitute an executable component. For example, such computer-executable instructions may be embodied on one or more computer-readable media that form a computer program product. An example of such an operation involves the manipulation of data.

The computer-executable instructions (and the manipulated data) may be stored in the memory 104 of the computing system 100. Computing system 100 may also contain communication channels 108 that allow the computing system 100 to communicate with other computing systems over, for example, network 110.

While not all computing systems require a user interface, in some embodiments, the computing system 100 includes a user interface 112 for use in interfacing with a user. The user interface 112 may include output mechanisms 112A as well as input mechanisms 112B. The principles described herein are not limited to the precise output mechanisms 112A or input mechanisms 112B as such will depend on the nature of the device. However, output mechanisms 112A might include, for instance, speakers, displays, tactile output, holograms and so forth. Examples of input mechanisms 112B might include, for instance, microphones, touchscreens, holograms, cameras, keyboards, mouse of other pointer input, sensors of any type, and so forth.

Embodiments described herein may comprise or utilize a special purpose or general-purpose computing system including computer hardware, such as, for example, one or more processors and system memory, as discussed in greater detail below. Embodiments described herein also include physical and other computer-readable media for carrying or storing computer-executable instructions and/or data structures. Such computer-readable media can be any available media that can be accessed by a general purpose or special purpose computing system. Computer-readable media that store computer-executable instructions are physical storage media. Computer-readable media that carry computer-executable instructions are transmission media. Thus, by way of example, and not limitation, embodiments of the invention can comprise at least two distinctly different kinds of computer-readable media: storage media and transmission media.

Computer-readable storage media includes RAM, ROM, EEPROM, CD-ROM or other optical disk storage, magnetic disk storage or other magnetic storage devices, or any other physical and tangible storage medium which can be used to store desired program code means in the form of computer-executable instructions or data structures and which can be accessed by a general purpose or special purpose computing system.

A "network" is defined as one or more data links that enable the transport of electronic data between computing systems and/or modules and/or other electronic devices. When information is transferred or provided over a network or another communications connection (either hardwired, wireless, or a combination of hardwired or wireless) to a computing system, the computing system properly views the connection as a transmission medium. Transmissions media can include a network and/or data links which can be used to carry desired program code means in the form of computer-executable instructions or data structures and which can be accessed by a general purpose or special purpose computing system. Combinations of the above should also be included within the scope of computer-readable media.

Further, upon reaching various computing system components, program code means in the form of computer-executable instructions or data structures can be transferred automatically from transmission media to storage media (or vice versa). For example, computer-executable instructions or data structures received over a network or data link can be buffered in RAM within a network interface module (e.g., a "NIC"), and then eventually transferred to computing system RAM and/or to less volatile storage media at a computing system. Thus, it should be understood that storage media can be included in computing system components that also (or even primarily) utilize transmission media.

Computer-executable instructions comprise, for example, instructions and data which, when executed at a processor, cause a general purpose computing system, special purpose computing system, or special purpose processing device to perform a certain function or group of functions. Alternatively, or in addition, the computer-executable instructions may configure the computing system to perform a certain function or group of functions. The computer executable instructions may be, for example, binaries or even instructions that undergo some translation (such as compilation) before direct execution by the processors, such as intermediate format instructions such as assembly language, or even source code.

Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the invention may be practiced in network computing environments with many types of computing system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, pagers, routers, switches, datacenters, wearables (such as glasses) and the like. The invention may also be practiced in distributed system environments where local and remote computing systems, which are linked (either by hardwired data links, wireless data links, or by a combination of hardwired and wireless data links) through a network, both perform tasks. In a distributed system environment, program modules may be located in both local and remote memory storage devices.

Those skilled in the art will also appreciate that the invention may be practiced in a cloud computing environment. Cloud computing environments may be distributed, although this is not required. When distributed, cloud computing environments may be distributed internationally within an organization and/or have components possessed across multiple organizations. In this description and the following claims, "cloud computing" is defined as a model for enabling on-demand network access to a shared pool of configurable computing resources (e.g., networks, servers, storage, applications, and services). The definition of "cloud computing" is not limited to any of the other numerous advantages that can be obtained from such a model when properly deployed.

Figure 2:
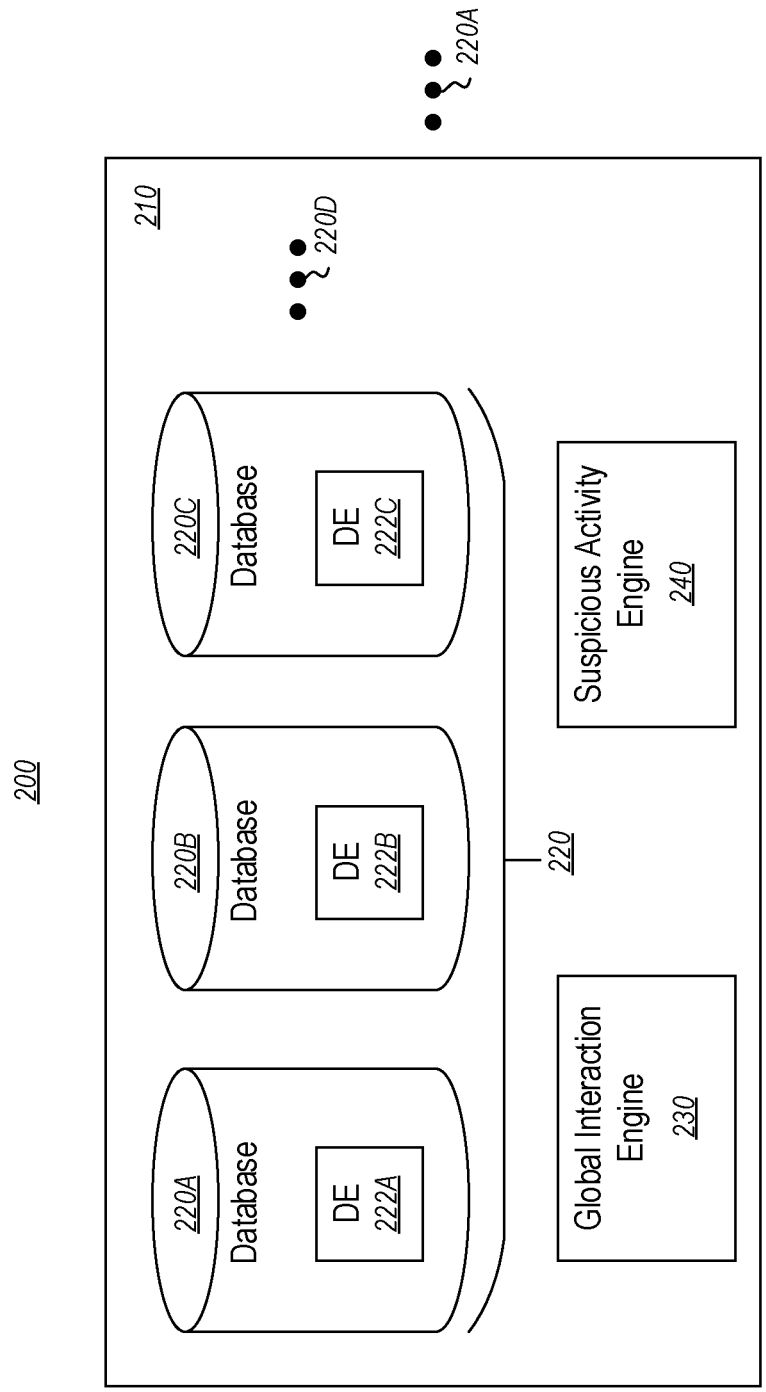
FIG. 2 illustrates an example environment of a multi-database system 210 that includes multiple databases

FIG. 2 illustrates an example environment 200 of a multi-database system 210 that includes multiple databases 220 that each have a corresponding database engine (i.e., database engine 222A, database engine 222B, and database engine 222C). As shown, the multi-database system 210 also includes a global interaction engine 230 and a suspicious activity engine 240, as described more fully herein. While only one multi-database system 210 is shown, ellipses 210A illustrates that any number of multi-database systems having any number of databases 220 may be included within environment 200. The multi-database system 210 may comprise any type of computer system that is capable of hosting multiple databases. For instance, the multi-database system 210 may comprise a cloud computer platform such as MICROSOFT® AZURE®, AMAZON WEB SERVICES®, and so forth.

Notably, the various engines and/or functional blocks of the computer system 200 may be implemented as software, hardware, or a combination of software and hardware. Additionally, the computer system 200 may include more or less than the engines/modules illustrated in FIG. 2. As such, some of the engines/modules may be combined or separated further, as circumstances warrant. Furthermore, although not illustrated, the various engines/modules of the multi-database environment 200 may access and/or utilize a processor and memory, such as processor 102 and memory 104, as needed to perform their various functions.

Oftentimes, breaches or attacks of sensitive data within databases such as those described herein, are performed by a valid user, which may be considered one of the major obstacles in providing secure databases. For instance, such an attacker may be an entity with valid credentials or an attacker that improperly obtained valid credentials. Previous and current solutions include prevention of unauthorized access of data (e.g., prevention via credential rotations, minimizing access, auditing, and so forth). However, these solutions may be a weak line of defense when credential theft or inappropriate usage of valid credentials occurs.

As such, the principles discussed herein utilize a local evaluation of each database within the multi-database system 210, as well as a global evaluation of all databases within the multi-database system to provide a comprehensive analysis and identification of suspicious (or malicious) activities occurring at the multi-database system. Such a comprehensive analysis may further include the ability to identify and/or deduce what data within a database is sensitive, as well as the ability to distinguish between valid data accesses and malicious data accesses even when a user (e.g., administrator, end user, server, and so forth) has valid credentials, as described further herein.

As briefly described, the multi-database system 210 may include multiple databases such as database 220A, database 220B, and database 230B (collectively referred to herein as the databases 220). While only three databases 220 are illustrated as being included within multi-database system 210, ellipses 220D represents that any number of databases 220 may be included within the multi-database system 210. The databases 220 may comprise any type of database, such as relational/SQL databases, NoSQL databases, and so forth.

As shown, each database 220 also includes a corresponding database engine 222. For instance, the database 220A has a corresponding database engine 222A, while the database 222B and the database 222C each have a corresponding database engine in database engine 222B and database engine 222C, respectively. Each database engine 222 may comprise any combination of hardware and/or software that is capable of performing any applicable management operations of a given database. For example, the database engine 222 may allow administrators to manage rules with respect to a given database (e.g., masking rules, encryption rules, access rules, privilege rules, and so forth), may receive and interpret queries of a given database, may build responses to queries of a given database, and so forth.

Accordingly, the database engine 222 may be intimately knowledgeable of any relevant information relating to a corresponding database 220. Such relevant information may include static information relating to a given database. Static information may include any configurations, policies, rules, and so forth that are associated with a given database 220. For instance, static information of which the database engine is knowledgeable may include masking rules, encryption rules, access rules, privilege rules, and so forth, that have been put in place by an administrator of a given database and/or the database engine itself.

Relevant information may also include dynamic interactions that have been performed, or are currently being performed, with respect to a given database that can be observed by the database engine 222. For instance, the dynamic interactions of which the database engine is knowledgeable may include performed queries, performed backups, data extractions, modifications of data, and so forth. In a more particular example, the database engine may know exactly which data is being accessed (e.g., which particular columns, rows, and so forth are being accessed). Similarly, the database engine may also be configured to identify a type of data being accessed, as described more fully herein. Notably, such dynamic interactions of which the database engine is aware, may be performed by an end user, a server, an administrator, and so forth.

The database engine may then perform an analysis of a corresponding database based on all relevant information (i.e., the static and dynamic information described herein) associated with the corresponding database. For instance, the database engine may identify access or usage patterns with respect to a corresponding database based at least partially on dynamic information observed and gathered relating to the database. In a more specific example, the database engine may identify access or usage patterns with respect to a particular end user or administrator. The database engine may also identify access or usage patterns across multiple users or administrators.

In another example, the database engine may also identify access or usage patterns with respect to particular data included within a corresponding database. For instance, the database engine may identify usage patterns associated with a particular column of data or type of data of a corresponding database. In another example, the database engine may also identify overall access or usage patterns associated with a corresponding database. For instance, the database engine may identify how the corresponding database is generally used during overall during peak usage times or during down times.

The database engine may also be configured to identify sensitive data that is included within a corresponding database. Sensitive data may be end user-defined, administrator defined, database-defined, and so forth. As such, an administrator or end user may be able to make the database engine aware of data that the administrator or end user considers to be sensitive (e.g., via a user interface of a corresponding database). For instance, sensitive data may comprise data of which it is critical that only an administrator or end user of such data gain access. In a more specific example, sensitive data may include passwords, financial information (e.g., credit card numbers, salary information, and so forth), social security numbers, and so forth.

In some embodiments, the database engine may use the static and/or dynamic information described herein to determine what particular data stored within a corresponding database is sensitive data. In an example, the database engine may use currently-in-place encryption or masking policies to identify sensitive data. For instance, the database engine may identify that a particular column or row of a corresponding database includes a particular encryption policy. As such, the database engine may further identify that because such data has the particular encryption policy, the encrypted data is considered to be sensitive. In another example, the database engine may determine that particular data (e.g., data within a particular column or row) of a corresponding database is sensitive (or likely to be sensitive) based on a data type of the particular data. As such, the database engine may identify that particular data is associated with a sensitive datatype, and is therefore considered to be sensitive data. For instance, sensitive data types may include a password data type, a social security number data type, a credit card number data type, and so forth.

As briefly mentioned, dynamic information (i.e., how administrators, end users, servers, and so forth interact with the database) may also be used by the database engine to identify sensitive data within a corresponding database. For instance, the database engine may determine that non-sensitive data is generally accessed in large volumes while sensitive data is generally accessed in small volumes. As such, the database may deduce that particular data that is consistently accessed in high volumes is likely to be non-sensitive, while particular data that is accessed in small volumes is likely to be sensitive. Notably, the specific sensitive data types described herein are disclosed for example purposes only. Thus, while specific sensitive data types are described herein, any number of sensitive data types may be identified by one of skill in the art.

Figures 3, 4:
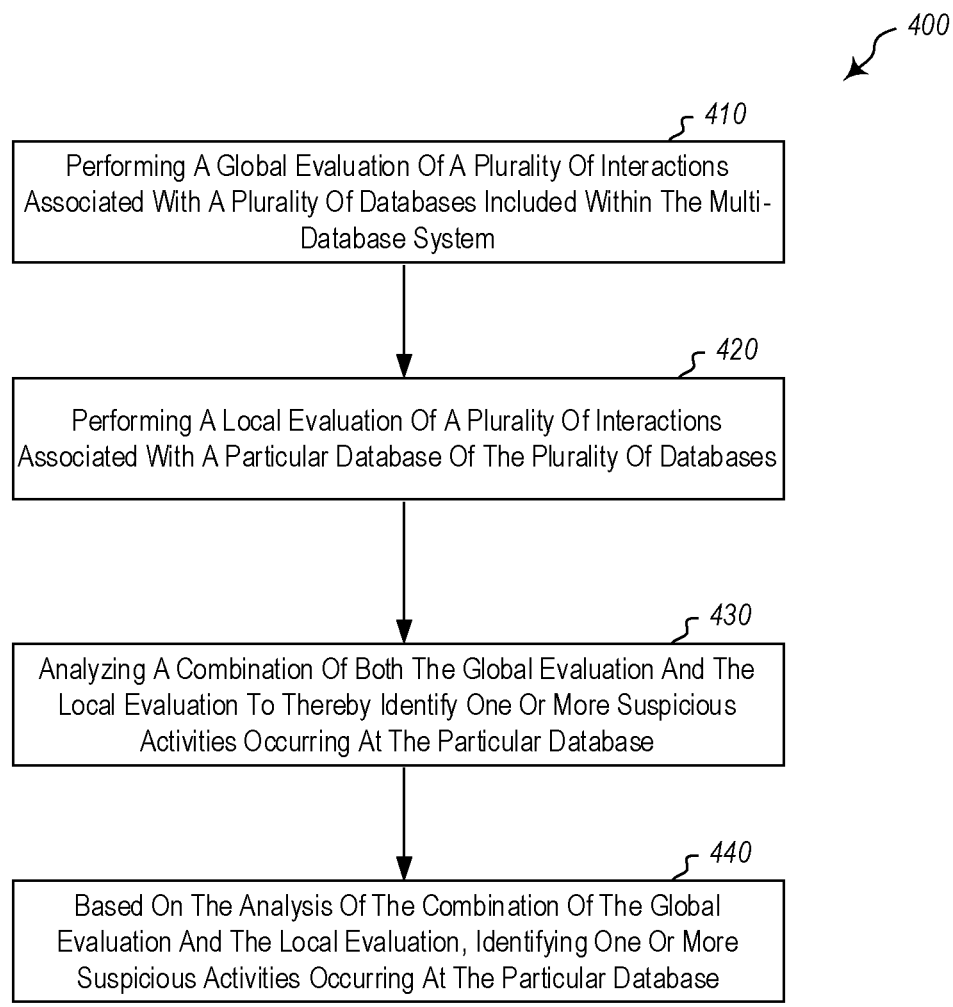
FIG. 3 illustrates example portions of data within a database that may be used by a database engine to identify sensitive data.
FIG. 4 illustrates a flowchart of a method for identifying suspicious activity at a database of a multi-database system.

FIG. 3 illustrates example portions of data within a database that may be used by the database engine to identify and/or deduce sensitive data. As shown, FIG. 3 includes four different types of data including a user ID type 302, a username type 304, a password type 306, and a credit card number type 308. For instance, as shown in FIG. 3, each particular cell of the credit card number type 308 may be masked in some form (e.g., encryption). As such, the database engine may identify that such data is masked and therefore automatically consider the data to be sensitive. In another example, the database engine may consider any data associated with passwords as sensitive information. Additionally, as described more fully herein, the database engine may be capable of identifying data within a corresponding database as being of a particular type. As such, the database engine may identify that each particular cell of the password type 306 relates to a password and as such, each cell includes sensitive data, whether or not each cell of the password data type is masked.

The database engine of a given database may further be configured to determine when suspicious activity (e.g., a malicious attack) is occurring (or has occurred) with respect to the corresponding database based on any combination of the static information, dynamic information, and identified sensitive data. In an example, the database engine may determine that suspicious activity has occurred when an abnormally large amount of data previously identified as being sensitive has been accessed by a valid user. Continuing with the previous example, the database engine may further consider access or usage patterns of any information associated with the potentially suspicious activity. For example, the database engine may further consider the usage patterns of the valid user (e.g., times when the user generally accesses data, the type and quantity of data the user usually accesses, from where the user generally accesses data, and so forth) in determining whether suspicious activity is, or has, occurred.

As briefly described with respect to FIG. 2, the multi-database system 210 may also include a global interaction engine 230. The global interaction engine 230 may perform a global evaluation or analysis of all interactions with all databases 220 of the multi-database system 210. As such, the global interaction engine 230 may be capable of communicating with each database engine of each database included within the multi-database system 210 to thereby identify what is occurring at each database. For instance, the global interaction engine may be configured to identify global access and usage patterns of the databases 220 included within the multi-database system. Identification of usage patterns may include usage patterns associated with a single user (e.g., end user, administrator, server, device, and so forth), multiple users, particular data, particular databases of the multi-database system, and so forth.

The global interaction engine may also be capable of identifying both static information and dynamic information, as described herein with respect to the database engines. The global interaction engine 230 may then use the identified access/usage patterns, the static information, and the dynamic information to determine when attacks, or malicious operations, appear to be occurring with respect to any number of databases within the multi-database system at a given time. In other words, the global interaction may have a global view of the interactions that are occurring (or have occurred) with respect to the databases 220 included within the multi-database system 210.

Accordingly, the global interaction engine may be able to identify suspicious activity based on any number of factors and information as both provided by particular database engines of databases included within the multi-database system, as well as information gathered by the global interaction engine itself. In a specific example, the global interaction engine may identify Internet Protocol (IP) addresses associated with devices accessing one or more databases 220. The global interaction engine may then be able to use the identified IP addresses to determine if any device associated with a particular IP address is performing any unusual activity. For instance, the global interaction engine may determine if the device associated with the IP address is accessing one or more databases using more than one database account.

Accordingly, the global interaction engine may be configured to intelligently identify suspicious activity across databases, across database accounts, and so forth, including suspicious IP address activity, unusual amounts of data backups being created, unusual volumes of data being accessed, unusual times for accessing data, unusual modification of data, unusual locations for accessing data, unusual activity based on usage patterns, and so forth. Notably, while particular suspicious activities are enumerated here, the enumerated suspicious activities are only for example purposes and are not meant to limit the principles described herein. Accordingly, the principles described herein may be practiced with essentially an unlimited number of possible suspicious activities.

The global interaction engine may also be capable of communicating with each individual database 220. For instance, the global interaction engine may alert a particular database 220 that other databases within the multi-database system 210 are currently experiencing suspicious activity, and further communicate to the particular database the type of suspicious activity that is occurring at other databases. Such communications may inform the database engine corresponding to the particular database of what types of suspicious activity (e.g., data breaches) are occurring elsewhere, and ultimately allow the database engine to implement any remedial measures to ensure that similar suspicious activity is not occurring at the particular database. For instance, the global interaction engine may determine that a breach has occurred with respect to database 220B and database 220C, and inform the database 220A of such (including exactly what type of breach(es) occurred). The database engine 222A may then have a heightened suspicion regarding all current and recent activities. The database engine 222A may further take any additional actions to prevent such activities from occurring at the database 220A.

Alternatively, in some embodiments, the global interaction engine 230 may be combined with the database engines of each database 220 such that the global interaction engine is configured to perform a local analysis of each database 220 included within the multi-database system 210, as described herein with respect to the description of a database engine (i.e., database engines 222A through 222C). In such embodiments, the global interaction engine 230 may also perform a global evaluation of all interactions with all databases 220 included within the multi-database system 210, as described herein.

As briefly described with respect to FIG. 2, the multi-database system 210 may also include a suspicious activity engine 240. The suspicious activity engine 240 may analyze any combination of the local evaluation(s) performed by a given database engine, as well as the global evaluation(s) of the global interaction engine to identify whether any suspicious or malicious activity is occurring (or has occurred) with respect to a given database 220. For instance, the suspicious activity engine 240 may gather usage patterns from the global interaction engine 230 and each database engine 222 to identify unusual accesses of data within a given database (or multiple databases within the multi-database system) based on an anomalous location from which a user (e.g., end user, administrator, server, and so forth) is accessing data, an anomalous time at which the user is accessing data, and so forth.

In other examples, the suspicious activity engine may identify suspicious interactions based on an identification of a particular user that accessed particular data (e.g., the particular user has access to the particular data, but has never accessed that data before) or an identification of a particular user that is using a different database subscription than the particular user has used in the past (e.g., based on IP address). The suspicious activity engine may also identify potentially suspicious activity based on cloud threat intelligence such as honeypots. For instance, one or more databases 220 of the multi-database system may employ a honeypot. As such, the suspicious activity engine (as well as a corresponding database engine and the global interaction engine) may identify any access of such a honeypot, and consider the access when evaluating the multi-database system and each database within the multi-database system for possible suspicious activity.

In another example, the suspicious activity engine may identify when data accesses have been performed with respect to currently compromised data (e.g., an encryption key of particular data has been improperly shared or released), and consider such within an evaluation of possible suspicious activity occurring with respect to the multi-database system or the databases 220 included therein. The suspicious activity engine may also identify unusual extraction or access of sensitive data based on the time the data was accessed, the amount of data accessed, the type of query used to access the data, the number and sequence of different sessions used to access data, and so forth. For instance, the suspicious activity engine may identify when there has been an unusually large volume of data extracted from a database or an anomalous back-up (or lack of a back-up) of redundant data, especially when such actions are performed with respect to data identified as sensitive.

Accordingly, the suspicious activity engine may consider any relevant information relating to both a global view of the multi-database system evaluated by the global interaction engine 230 and a local view of each database 220 of the multi-database system evaluated by each corresponding database engine to identify one or more suspicious activities occurring at any one of the databases 220. The suspicious activity engine may also be configured to communicate directly with both database engines and the global interaction engine such that when suspicious activity is occurring, the suspicious activity may make any applicable database engines and the global interaction engine aware of the suspicious activity. As such, the database engines and global interaction engine that receive such information may then have a heightened sense of suspicion regarding all current interactions and may further take any appropriate remedial measures to ensure that the suspicious activity does not result in a data breach (or in further data breaches).

Notably, while various examples of the type of interactions and information that may be identified and considered by the suspicious activity engine in evaluating whether suspicious (or malicious) activity is occurring at the multi-database system (e.g., one or more databases within the multi-database system) have been described herein, the suspicious activity engine may be capable of identifying and/or considering essentially limitless information associated with the multi-database system 210. Accordingly, the principles described herein are not limited to the specific examples of information/interactions considered by the suspicious activity described herein.

FIG. 4 illustrates a flowchart of a method 400 for identifying suspicious activity at a database of a multi-database system. The method 400 is described with frequent reference to the environment 200 of FIG. 2. The method 400 may begin by performing a global evaluation of a plurality of interactions associated with a plurality of databases included within the multi-database system (Act 410). For instance, the global interaction engine 230 may identify one or more usage patterns associated with each of the databases 220 of the multi-database system 210. The global interaction engine may further determine use the identified usage patterns to determine whether any suspicious activity is occurring at any of the plurality of databases 220. Additionally, the global interaction engine may communicate with the database engine of each database 220 to gather more detailed information regarding each database to thereby perform a more detailed global evaluation of all databases 220.

The method 400 may also include performing a local evaluation of a plurality of interactions associated with a particular database of the plurality of databases (Act 420). The plurality of interactions associated with the particular database may comprise a subset of the plurality of interactions associated with the plurality of databases. For example, the database engine of each database 220 may identify both static (e.g., masking rules that are currently in place) and dynamic information (e.g., queries that are currently being performed) associated with the given database, as described more fully herein. The static and dynamic information may then be used by the database engine to both identify sensitive data and to potentially suspicious (or malicious) activity.

The method 400 may also include analyzing a combination of both the global evaluation and the local evaluation to thereby identify one or more suspicious activities occurring at the particular database (Act 430). For example, the suspicious activity engine 240 may receive the global evaluation and the local evaluation performed by the global interaction engine and the database engine, respectively. The suspicious activity engine may then analyze a combination of the global evaluation, the local evaluation, and any other relevant information (e.g., sensitivity of data being accessed) to thereby identify one or more suspicious activities occurring globally or with respect to the particular database. The method 400 may further include, based on the analysis of the combination of the global evaluation the local evaluation, identifying one or more suspicious activities occurring at the particular database (Act 440). For instance, the suspicious activity engine may then use the analysis of the global and local evaluations to identify any suspicious activity that is occurring or that previously occurred at the particular database (or at the multi-database system). In a more specific example, the suspicious activity engine may identify that a user having valid credentials has maliciously accessed sensitive data based on any number of factors (e.g., historical usage data, volume of data accessed, type of data accessed, and so forth).

In this way, local evaluations of databases within a multi-database system may be performed in conjunction with global evaluations of the entire multi-database system such that insights at both levels may be used to identify suspicious or malicious activity that may be occurring at one or more of the databases of the multi-database system. Such insights may allow for identifying sensitive data included within each database, as well as distinguishing between normal activity and suspicious activity even among those database users that have valid credentials. Additionally, such global evaluations may be used locally by particular databases to heighten awareness and suspicion of current interactions when one or more data breaches are occurring or have recently occurred with respect to one or more other databases of the multi-database system.

Although the subject matter has been described in language specific to structural features and/or methodological acts, it is to be understood that the subject matter defined in the appended claims is not necessarily limited to the described features or acts described above, or the order of the acts described above. Rather, the described features and acts are disclosed as example forms of implementing the claims.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed:

1. A computer system comprising:
one or more processors; and
one or more computer-readable storage device having stored thereon computer-executable instructions that are executable by the one or more processors to cause the computer system to identify suspicious activity at a database of a multi-database system, the computer-executable instructions including instructions that are executable to cause the computer system to perform at least the following:
perform, by a global interaction engine, a global evaluation of a plurality of interactions associated with a plurality of databases included within the multi-database system;
perform, by a first local database engine corresponding to a first database of the plurality of databases a local evaluation of a plurality of interactions associated with the database, the plurality of interactions associated with the first database comprising a subset of the plurality of interactions associated with the plurality of databases;
analyze, by a suspicious activity engine, a combination of both the global evaluation by the global interaction engine and the local evaluation, by the first local database engine, to thereby identify one or more suspicious activities occurring at the first database;
based on the analysis of the combination of the global evaluation and the local evaluation, identify, by the suspicious activity engine, one or more suspicious activities occurring at the first database; and
alert a second database engine corresponding to a second database of the plurality of databases of a type of the one or more suspicious activities occurring at the first database, enabling the second database engine to implement one or more remedial measures to ensure that similar suspicious activity does not occur at the second database, wherein the one or more suspicious activities occurring at the first database affect a first set of data stored in the first database, the one or more remedial measures implemented at the second database are to protect a second set of data stored in the second database, and the first set of data and the second set of data are different data sets.

2. The computer system in accordance with claim 1, wherein the local evaluation comprises identifying usage patterns associated with the first database.

3. The computer system in accordance with claim 2, wherein identifying usage patterns comprises identifying usage patterns relating to at least one of a user of the first database or particular data included within the first database.

4. The computer system in accordance with claim 1, wherein the global evaluation comprises identifying global usage patterns associated with each of the plurality of databases.

5. The computer system in accordance with claim 1, wherein the computer-executable instructions further include instructions that are executable to cause the computer system to identify which data included within the first database is sensitive data.

6. The computer system in accordance with claim 5, wherein the computer-executable instructions further include instructions that are executable to cause the computer system to analyze which data included within the first database is sensitive data in combination with both the global evaluation and the local evaluation to thereby identify one or more suspicious activities occurring at the first database.

7. The computer system in accordance with claim 1, wherein the global evaluation is performed by the global interaction engine of the multi-database system.

8. The computer system in accordance with claim 1, wherein the local evaluation is performed by the global interaction engine of the multi-database system.

9. A method, implemented at a computer system that includes one or more processors, for identifying suspicious activity at a database of a multi-database system, comprising:
performing, by a global interaction engine, a global evaluation of a plurality of interactions associated with a plurality of databases included within the multi-database system;
performing, by a first local database engine corresponding to a first database of the plurality of databases, a local evaluation of a plurality of interactions associated with the first database, the plurality of interactions associated with the first database comprising a subset of the plurality of interactions associated with the plurality of databases;
analyzing, by a suspicious activity engine, a combination of both the global evaluation by the global interaction engine and the local evaluation by the first local database engine, to thereby identify one or more suspicious activities occurring at the first database;
based on the analysis of the combination of the global evaluation and the local evaluation, identifying, by the suspicious activity engine, one or more suspicious activities occurring at the first database; and
alerting a second database engine corresponding to a second database of the plurality of databases of a type of the one or more suspicious activities occurring at the first database, enabling the second database engine to implement one or more remedial measures to ensure that similar suspicious activity does not occur at the second database, wherein the one or more suspicious activities occurring at the first database affect a first set of data stored in the first database, the one or more remedial measures implemented at the second database are to protect a second set of data stored in the second database, and the first set of data and the second set of data are different data sets.

10. The method in accordance with claim 9, wherein the local evaluation comprises identifying usage patterns associated with the first database.

11. The method in accordance with claim 10, wherein identifying usage patterns comprises identifying usage patterns relating to at least one of a user of the first database or particular data included within the first database.

12. The method in accordance with claim 9, wherein the global evaluation comprises identifying global usage patterns associated with each of the plurality of databases.

13. The method in accordance with claim 9, further comprising identifying which data included within the first database is sensitive data.

14. The method in accordance with claim 13, further comprising analyzing which data included within the first database is sensitive data along with the combination of both the global evaluation and the local evaluation to thereby identify one or more suspicious activities occurring at the first database.

15. A computer program product comprising one or more hardware storage devices having stored thereon computer-executable instructions that are executable by one or more processors of a computer system to identify suspicious activity at a database of a multi-database system, the computer-executable instructions including instructions that are executable to cause the computer system to perform at least the following:

performing, by a global interaction engine, a global evaluation of a plurality of interactions associated with a plurality of databases included within the multi-database system;

performing, by a first local database engine corresponding to a first database of the plurality of databases, a local evaluation of a plurality of interactions associated with the first database, the plurality of interactions associated with the first database comprising a subset of the plurality of interactions associated with the plurality of databases;

analyzing, by a suspicious activity engine, a combination of both the global evaluation by the global interaction engine and the local evaluation by the first local database engine, to thereby identify one or more suspicious activities occurring at the first database;

based on the analysis of the combination of the global evaluation and the local evaluation, identifying, by the suspicious activity engine, one or more suspicious activities occurring at the first database; and alerting a second database engine corresponding to a second database of the plurality of databases of a type of the one or more suspicious activities occurring at the first database, enabling the second database engine to implement one or more remedial measures to ensure that similar suspicious activity does not occur at the second database, wherein the one or more suspicious activities occurring at the first database affect a first set of data stored in the first database, the one or more remedial measures implemented at the second database are to protect a second set of data stored in the second database, and the first set of data and the second set of data are different data sets.

16. The computer program product in accordance with claim 15, wherein the local evaluation comprises identifying usage patterns associated with the first database.

17. The computer program product in accordance with claim 16, wherein identifying usage patterns comprises identifying usage patterns relating to at least one of a user of the first database or particular data included within the first database.

* * * * *